Patented Oct. 18, 1927.

1,646,177

UNITED STATES PATENT OFFICE.

LEWIS O. ULLOM, OF ELLWOOD CITY, PENNSYLVANIA.

PROCESS OF REMOVING WALL PAPER FROM WALLS.

No Drawing. Application filed May 11, 1925. Serial No. 29,643.

This invention relates to the process of removing wall paper from the walls by means of a saturated solution of oxalic acid in water. To use this solution it is just necessary to apply it to the walls with a sponge or brush. The solution dissolving the paste, the paper is readily pulled from the walls. If it be desired I may apply this solution in the form of vapor by steaming or I may apply it wet and go over the walls with a heated iron to make its action more effective.

I claim:

1. The process of removing wall paper from the wall by loosening the paste from the wall by the application thereto of a solution of oxalic acid.

2. The process of removing the wall paper from the walls by destroying the adhesion to paper of substance used to fasten paper to walls or other surfaces by the application of a solution of oxalic acid.

3. The process of removing wall paper from walls by softening the paper with a softening agent of oxalic acid.

4. The process of removing wall paper from the walls by saturating the paper with a removing agent of oxalic acid.

5. The process of removing wall paper from the walls or other surfaces by saturating and softening the adhesive substance with a solution of oxalic acid thereby destroying the adhesion of the paper to the walls.

6. The process of removing wall paper from the walls by steaming with a solution of oxalic acid in water.

7. The process of removing wall paper from the walls by applying a solution of oxalic acid in water and going over this with a heated iron.

In testimony hereof I hereunto affix my signature.

LEWIS O. ULLOM.